(No Model.)

F. KRAEMER.
RHEOSTAT OR ELECTRIC HEATER.

No. 595,395. Patented Dec. 14, 1897.

Witnesses:
William S. Johnston
John D. Williamson

Inventor:
Frank Kraemer
By Rudolph M. Lotz
Attorney.

UNITED STATES PATENT OFFICE.

FRANK KRAEMER, OF CHICAGO, ILLINOIS.

RHEOSTAT OR ELECTRIC HEATER.

SPECIFICATION forming part of Letters Patent No. 595,395, dated December 14, 1897.

Application filed January 23, 1896. Serial No. 576,588. (No model.)

*To all whom it may concern:*

Be it known that I, FRANK KRAEMER, a citizen of the United States, residing at Chicago, in the county of Cook and State of Illinois, have invented certain new and useful Improvements in Rheostats or Electric Heaters; and I do hereby declare the following to be a full, clear, and exact description of the invention, such as will enable others skilled in the art to which it appertains to make and use the same.

This invention relates to a novel construction in a rheostat or electric heater, the object being to provide devices of this kind of simple and durable construction and the highest efficiency combined with cheapness.

The invention described and claimed herein comprises improvements resulting from experiments with the device forming subject of Patent No. 554,632.

Figure 1:
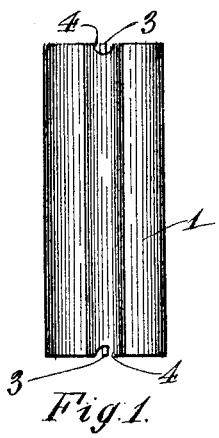
Figure 2:
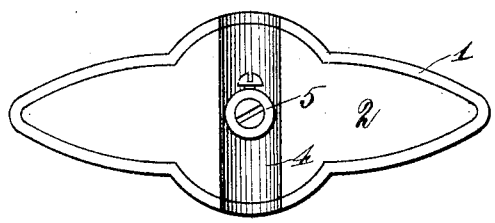
Figure 3:
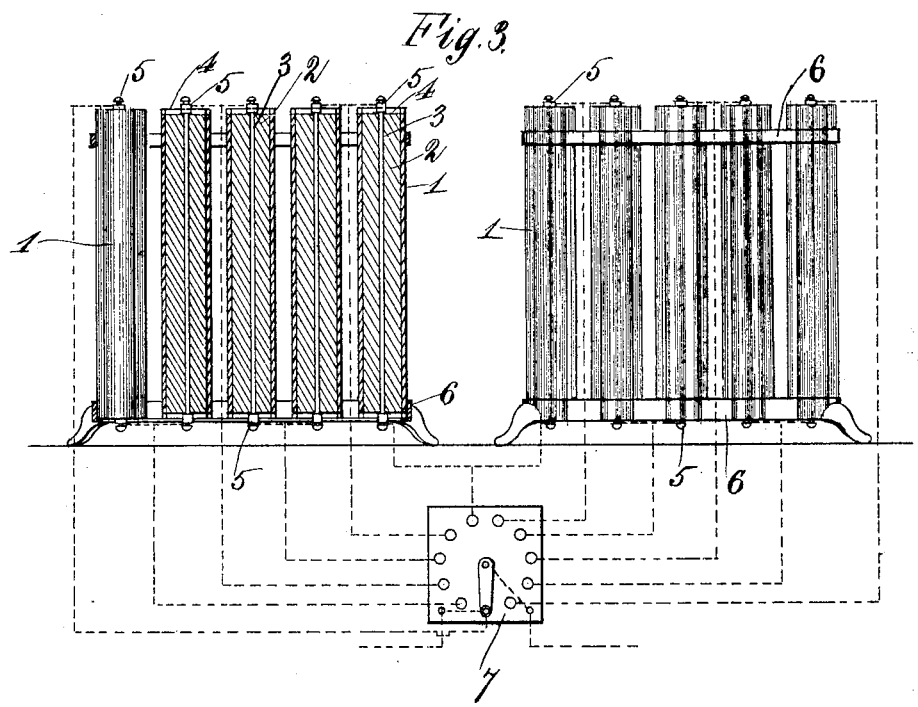

In the accompanying drawings, illustrating my invention, Figure 1 is a detail side elevation of a rheostat or electric heater constructed in accordance with my invention. Fig. 2 is a top plan view of the same on an enlarged scale. Fig. 3 is a view in elevation of several heaters connected together to form radiators and a face-plate or switch with which they are connected.

During my experiments with electric rheostats or heaters composed of carbon sticks embedded in a plastic material I found that the plastic material retained the heat to such an extent that it was impossible to obtain the requisite radiation, and besides this difficulty I was obliged to exercise undue care in so embedding the carbon sticks I employed in the plastic material that the same would not be strained at any point, as this would invariably cause them to fracture after being in use only a short time. The slightest transverse fracture in one of these carbons would immediately cause the formation of an arc, under the intense heat of which the plastic material would melt and destroy the heater. As the carbons I employ are of a very high resistance and vary from one-eighth to one-fourth of an inch in diameter and average twelve inches in length it will be obvious that they are very fragile and require the utmost care in handling. To overcome these objections, I provide a metal tube or casing 1, preferably of cast-iron and practically of the same shape as those at present in use in steam and hot-water radiators, which is filled with plastic material 2, in which the carbon stick 3 is embedded. The said carbon stick 3 is preferably situated in the center of the metal tube and is of the same length therewith. A channel or groove 4 extends transversely across the middle of the upper and lower ends of said tube and plastic material, and the ends of the carbon sticks project therefrom to permit binding-post 5 to be secured thereto. The said tubes 1 are wide and rather flat, having corrugated faces to give the largest possible radiating-surface. Any number of said tubes can be set in a frame 6 to form a radiator of a size sufficient to heat a given space, the number being regulated in the same manner as the coils of a steam or hot-water radiator. In Fig. 3 I have shown two radiators having five coils or tubes each, both of the same being connected with a face-plate or switch 7, so that all the coils of both, part of the coils of one, and all of the coils of the other, or only a few coils of one radiator, can be thrown into the circuit, as desired, thus enabling perfect regulation of the temperature. The said frame 6 may be of any suitable shape to permit of the coils being set therein. It will be noted that the coils can be removed singly and replaced at any time in case of accident to one of them, which is obviously very advantageous.

In embedding the carbons in the tube the carbon is first placed in position therein in any suitable manner, the tube being in an upright position, and the plastic material introduced in small quantities at a time and compressed in such a manner as to avoid any side pressure against the carbons. In this manner the stability of the carbon after the plastic material is dry is assured.

In constructing the said rheostats or heaters it is indispensable that the plastic material employed should have practically the same coefficient of expansion and contraction under varying degrees of temperature as said carbons, and that the coefficients of expansion and contraction of the carbons, plastic material, and iron casing shall be so related to each other that neither of them shall exert sufficient compression, pressure, or tensile strain upon the others to fracture any part. It will be obvious that if the coefficient of expansion and contraction of the plastic material under varying degrees of temperature is greater than that of either the carbons or the metal casing the latter would be in constant danger of fracture, particularly the carbons, while, on the contrary, if it were less the carbon would either burst the plastic material or be fractured by the pressure thereon, while the metal casing would fracture the outer portions of the plastic material. To find a plastic material, therefore, having the properties conforming to the above requirements involved long and tedious experiments; but I have now found that a plastic material made from the following ingredients, in certain proportions, answers the purpose—that is, a plastic material composed of barite and silicic acid.

By means of my construction the heat can be regulated to a nicety, as any number of coils of a radiator can be thrown into the circuit, and the construction of the coils themselves assures a very steady temperature, owing to the heat-retaining properties of the plastic material, which prevents a rapid change of temperature under variations of the electric current. I find in practice that after heating my radiator to a given degree by a given current the same degree can be maintained by one-third of the current required to raise the radiator to that degree of temperature.

My construction also assures the greatest possible economy, particularly in cities where the current is supplied by corporations and charged according to the amount used, as the current can be cut off entirely when the desired temperature has been obtained and can be varied according to the change of weather, whereas in steam heating the fires cannot be allowed to go out during unexpectedly warm weather, thus creating an uncomfortably high temperature and causing useless expenditure of coal. The average expense of heating with my heater for a one hundred-and-ten-volt circuit is one kilowatt per hour for every thirty thousand cubic feet of space during the average cold weather.

It will of course be understood that I do not wish to limit myself to any particular number of carbons embedded in a tube, nor to any particular shape of tube, as these details may be changed and varied without departing from the spirit of my invention; nor do I wish to be limited to any particular manner of electrically connecting the various coils, as it will be obvious that this will be governed by the conditions of the space to be heated.

I claim as my invention—

In an electric rheostat or heater, solid carbon sticks of a high resistance completely embedded in a plastic material composed of barite or its equivalent and silicic acid.

In testimony whereof I affix my signature in presence of two witnesses.

FRANK KRAEMER.

Witnesses:
    RUDOLPH WM. LOTZ,
    WILLIAM S. JOHNSTON.